US012236504B2

(12) United States Patent
Diaz et al.

(10) Patent No.: US 12,236,504 B2
(45) Date of Patent: *Feb. 25, 2025

(54) GRAPHICAL USER INTERFACE

(71) Applicant: Xero Limited, Wellington (NZ)

(72) Inventors: Diego Granados Diaz, Wellington (NZ); Hayden Thomas Doward, Wellington (NZ)

(73) Assignee: Xero Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,828

(22) Filed: Dec. 8, 2023

(65) Prior Publication Data

US 2024/0104805 A1 Mar. 28, 2024

Related U.S. Application Data

(63) Continuation of application No. 18/189,563, filed on Mar. 24, 2023, now Pat. No. 11,908,050, which is a
(Continued)

(51) Int. Cl.
*G06T 11/20* (2006.01)
*G06F 3/0482* (2013.01)
(Continued)

(52) U.S. Cl.
CPC .......... *G06T 11/206* (2013.01); *G06F 3/0482* (2013.01); *G06T 3/20* (2013.01);
(Continued)

(58) Field of Classification Search
CPC . G06T 11/206; G06T 3/20; G06T 3/40; G06T 3/60; G06T 2200/24; G06F 3/0482; G06F 2203/04806
See application file for complete search history.

(56) References Cited

U.S. PATENT DOCUMENTS

2005/0275622 A1 12/2005 Patel et al.
2008/0046506 A1 2/2008 Broda
(Continued)

OTHER PUBLICATIONS

PK: An Excel Expert, "Fully dynamic chart in Excel with scroll bar and spin button form controls", Mar. 19, 2020, https://www.youtube.com/watch?v=QWJQZLGQ4Gw. (3 pages).
(Continued)

*Primary Examiner* — Michelle L Sams
(74) *Attorney, Agent, or Firm* — Young Basile Hanlon & MacFarlane, P.C.

(57) ABSTRACT

A graphical user interface for display on a display screen of a user device is configured for display in a window occupying all or a portion of the display screen and has a first frame occupying a first frame region of the window. The first frame illustrates, adjacent to one another in a first dimension, graph visual elements each representing a respective graph data entry from a continuous subset among a sequence of graph data entries, each of the sequence having a defined placement and a quantitative value. The continuous subset is determined in response to selective zooming and/or scrolling of the first frame region by user interaction. The graph visual elements each have, in a second dimension, a linear extent or position determined according to the size of the first frame region in the second dimension, the quantitative value of the respective graph data entry, and dynamic scaling factor.

19 Claims, 7 Drawing Sheets

Related U.S. Application Data continuation of application No. PCT/NZ2022/050062, filed on May 31, 2022.

(51) Int. Cl.
*G06T 3/20* (2006.01)
*G06T 3/40* (2006.01)
*G06T 3/60* (2006.01)

(52) U.S. Cl.
CPC .............. *G06T 3/40* (2013.01); *G06T 3/60* (2013.01); *G06F 2203/04806* (2013.01); *G06T 2200/24* (2013.01)

(56) References Cited

U.S. PATENT DOCUMENTS

| | | |
|---|---|---|
| 2010/0194754 A1 | 8/2010 | Alsbury et al. |
| 2010/0214216 A1 | 8/2010 | Nasiri et al. |
| 2017/0010792 A1 | 1/2017 | Stewart |
| 2017/0147681 A1 | 5/2017 | Tankersley et al. |
| 2018/0004851 A1 | 1/2018 | Zarins et al. |
| 2019/0050116 A1 | 2/2019 | Kim et al. |
| 2021/0406045 A1 | 12/2021 | Falter et al. |

OTHER PUBLICATIONS

Ken Boyd, "How to use excel for accounting", Dec. 9, 2020, https://quickbooks.intuit.com/r/bookkeeping/excel-accounting-bookkeeping/. (8 pages).

"Starting out with QuickBooks online for businesses", 2019, https://quickbooks.intuit.com/content/dam/intuit/quickbooks/msm/sites/en/global/Global%20QuickBooks%20Online%20User%20Guide%202019.pdf . (76 pages).

Joe Habraken, "Microsoft Office 2010 in Depth", 2011, Que Publishing. (292-293, 334-335, 381-384 pages).

GRAPHICAL USER INTERFACE

CROSS-REFERENCE TO RELATED APPLICATION

This application is a continuation application of U.S. patent application Ser. No. 18/189,563, filed Mar. 24, 2023, which is a continuation application of International Application Serial No. PCT/NZ2022/050062, filed May 31, 2022, the entire disclosures of which are hereby incorporated by reference.

TECHNICAL FIELD

Embodiments belong to the field of mechanisms for navigating and manipulating data, and in particular relate to graphical user interfaces.

BACKGROUND

Representation/presentation of data in a graphical format, especially when the values being represented by the graph elements have a high degree of variance can be difficult and lead to incomprehensible and/or meaningless representations that do not properly convey the desired information. Prior art solutions present graphical data at scales that are not easily interpreted, and/or require manual changing of scaling value/axes values by a user to attempt to represent as much of the data as possible at a scale that is readily interpretable. This may result in a 'good enough' presentation that does not truly present the data in the best way possible.

It is desired to address or ameliorate some of the disadvantages associated with such prior methods and systems, or at least to provide a useful alternative thereto.

Throughout this specification the word "comprise," or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Embodiments include a graphical user interface for display on a display screen of a user device, wherein the graphical user interface is configured for display in a window occupying all or a portion of the display screen and comprising: a first frame occupying a first frame region of the window; wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to selective zooming and/or scrolling of the first frame region in the first dimension by user interaction with the first frame region; the graph visual elements each having, in a second dimension, a linear extent or a position determined according to the size of the first frame region in the second dimension, the quantitative value of the respective graph data entry, and a dynamic scaling factor; wherein, in response to the selective zooming and/or scrolling of the first frame in the first dimension, the graph data entries belonging to the continuous subset of graph data entries represented by the graph visual elements changes, and the dynamic scaling factor changes according to the quantitative values of the changed continuous subset of graph data entries.

Optionally, the first dimension and second dimension are mutually orthogonal and are parallel to respective edges of the display screen of the user device.

Optionally, the respective edge of the display screen device with which the first dimension and second dimension are parallel is interchangeable according to rotation of the window in response to physical rotation of the user device.

Optionally, the graphical user interface further comprises a second frame occupying a second frame region of the window, the second frame illustrates, for a selected graph data entry among the sequence of graph data entries, at least a portion of a plurality of entry components of the selected graph data entry, the plurality of entry components being individually labelled quantitative values which are combined to calculate the quantitative value of the selected graph data entry.

Optionally, the selected graph data entry is selected by user interaction with the first frame region, by a user input located at the graph visual element representing the selected graph data entry.

Optionally, the second frame illustrates a portion of the plurality of entry components of the selected graph data entry as a selectively scrollable list of component visual elements, each component visual element comprising the respective labelled quantitative value, wherein, in response to selective zooming and/or scrolling of the second frame in the second dimension, the portion of the plurality of entry components of the selected graph data entry changes.

Optionally, the graphical user interface is a single page application, or is a part of a single page application.

Optionally, the sequence of graph data entries are stored on a server and loaded onto the user device by the graphical user device on demand according to the selective zooming and/or scrolling of the first frame in the first dimension, wherein graphical user interface is configured, while the graph visual elements representing the continuous subset of graph data among the sequence of graph data entries are illustrated in the first frame, checking whether a predefined number of graph data entries either side of the continuous subset are loaded on the user device, and if they are not loaded on the user device, loading onto the user device any missing graph data entries from among the predefined number of graph data entries either side of the continuous subset.

Optionally, the graphical user interface is part of an online bookkeeping system providing an online bookkeeping service to users, the graphical user interface being accessible to a logged in user.

Optionally, the sequence of graph data entries forms one or more time series so that the defined placement among the sequence of each graph data entry is defined primarily according to a time period represented by the respective graph data entry and secondarily according to the time series to which the graph data entry belongs.

Optionally, the one or more time series comprises two time series, and for each of a continuous series of time periods there is a graph data entry in each of the two time series.

Optionally, a first time series represents income per time period and a second time series represents expenditure per time period, wherein income and expenditure per time period are calculated by obtaining a transaction dataset for the user, financial transactions being represented in the transaction dataset by an entry component having a label, an associated time value, and a quantitative value representing transaction value, each graph data entry being calculated by identifying entry components having an associated time value belonging to the represented time period, classifying the identified entry components as income or expenditure, and summing the entry components per class to determine the quantitative value of the graph data entry.

Optionally, the selective zooming and/or scrolling of the first frame region in the first dimension by user interaction with the first frame region is a selective zooming in or out in the first dimension, the GUI being configured to respond to the selective zooming in or out in the first dimension by changing granularity of the graph visual elements in the first dimension.

Optionally, the granularity is changed within a series of predefined granularities.

Optionally, the sequence of graph data entries forms one or more time series, and wherein the predefined granularities are time periods represented by each graph visual element, and optionally wherein the series of predefined granularities includes one day per graph visual element, one week per graph visual element, one calendar month per graph visual element, and one quarter-year per graph visual element.

Optionally, the first frame transitions from a first rendered state before the selective zooming and/or scrolling of the first frame region in the first dimension by user interaction with the first frame region, to a second rendered state responding to the selective zooming and/or scrolling of the first frame region in the first dimension by user interaction with the first frame region, and wherein between the first rendered state and the second rendered state the first frame region is rendered in one or more intermediate rendered states, wherein any graph visual element rendered in both the first rendered state and the second rendered state and resized according to the calculated dynamic scaling factor, is resized in a progressive stepwise manner between subsequent rendered states.

Optionally, the user device is a mobile device, and optionally wherein the mobile device is a smart phone or a tablet and the display screen is a touchscreen.

Embodiments of another aspect include a system comprising a server computing apparatus and a user device, the server computing apparatus comprising memory hardware storing a single page application for serving to the user device, and a network interface for serving the single page application to the user device, the user device comprising a network interface for receiving the single page application from the server computing apparatus, memory hardware for storing the received single page application, processing hardware for executing processing instructions and/or processing logic defined by the stored single page application, and a display screen for displaying a graphical user interface defined by the single page application, wherein the graphical user interface for display on the display screen of a user device, the graphical user interface being configured for display in a window occupying all or a portion of the display screen and comprising: a first frame occupying a first frame region of the window; wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to selective zooming and/or scrolling of the first frame region in the first dimension by user interaction with the first frame region; the graph visual elements each having, in a second dimension, a linear extent or a position determined according to the size of the first frame region in the second dimension, the quantitative value of the respective graph data entry, and a dynamic scaling factor; wherein, in response to the selective zooming and/or scrolling of the first frame in the first dimension, the graph data entries belonging to the continuous subset of graph data entries represented by the graph visual elements changes, and the dynamic scaling factor changes according to the quantitative values of the changed continuous subset of graph data entries.

Optionally, the user device is a mobile device, and optionally wherein the mobile device is a smart phone or a tablet and the display screen is a touchscreen.

Embodiments of another aspect include a computer program comprising processing instructions which, when executed by a computing apparatus, cause the computing apparatus to display, on a display screen of the computing apparatus, a graphical user interface, the graphical user interface being configured for display in a window occupying all or a portion of the display screen and comprising: a first frame occupying a first frame region of the window; wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to selective zooming and/or scrolling of the first frame region in the first dimension by user interaction with the first frame region; the graph visual elements each having, in a second dimension, a linear extent or a position determined according to the size of the first frame region in the second dimension, the quantitative value of the respective graph data entry, and a dynamic scaling factor; wherein, in response to the selective zooming and/or scrolling of the first frame in the first dimension, the graph data entries belonging to the continuous subset of graph data entries represented by the graph visual elements changes, and the dynamic scaling factor changes according to the quantitative values of the changed continuous subset of graph data entries.

Embodiments may include a non-transitory computer-readable medium storing the computer program as set out above.

Embodiments of another aspect include a method comprising: configuring a graphical user interface for display on a display screen of a user device, wherein the graphical user interface is configured for display in a window occupying all or a portion of the display screen and comprises: a first frame occupying a first frame region of the window; wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to selective zooming and/or scrolling of the first frame region in the first dimension by user interaction with the first frame region; the graph visual elements each having, in a second dimension, a linear extent or a position determined according to the size of the first frame region in the second dimension, the quantitative value of the respective graph data entry, and a dynamic scaling factor; wherein, in response to the selective zooming and/or scrolling of the first frame in the first dimension, the graph data entries belonging to the continuous subset of graph data entries represented by the graph visual elements changes, and the dynamic scaling factor changes according to the quantitative values of the changed continuous subset of graph data entries.

Advantageously, embodiments provide an interface enabling intuitive navigation of stored data by a user of a user device. The user device becomes a mechanism for navigating the stored data. The display screen of the user device has a finite area for displaying stored data (or a representation thereof). Embodiments provide a mechanism for maximising the utility of the finite area. Embodiments provide a mechanism for maximising the utility of a finite area for displaying stored data within a single page application. Embodiments dynamically re-scale graph data within a single page application. Some embodiments re-scale a graph y-axis in response to scrolling the graph along the x-axis, based on the values to be displayed in the scrolled graph.

Embodiments are particularly advantageous in mobile devices wherein there is limited physical space available to display complex information. Embodiments address the technical challenge by providing an innovative re-scaling first frame region via the dynamic scaling factor.

Advantageously, embodiments provide mechanism for illustrating parallel related time series, such as income & expenditure values for corresponding time periods.

Advantageously, embodiments further maximise utility of finite area by making visual graph elements selectable elements within a first window to display more details relating to the selected visual graph element in a second window.

DETAILED DESCRIPTION

Figure 1:
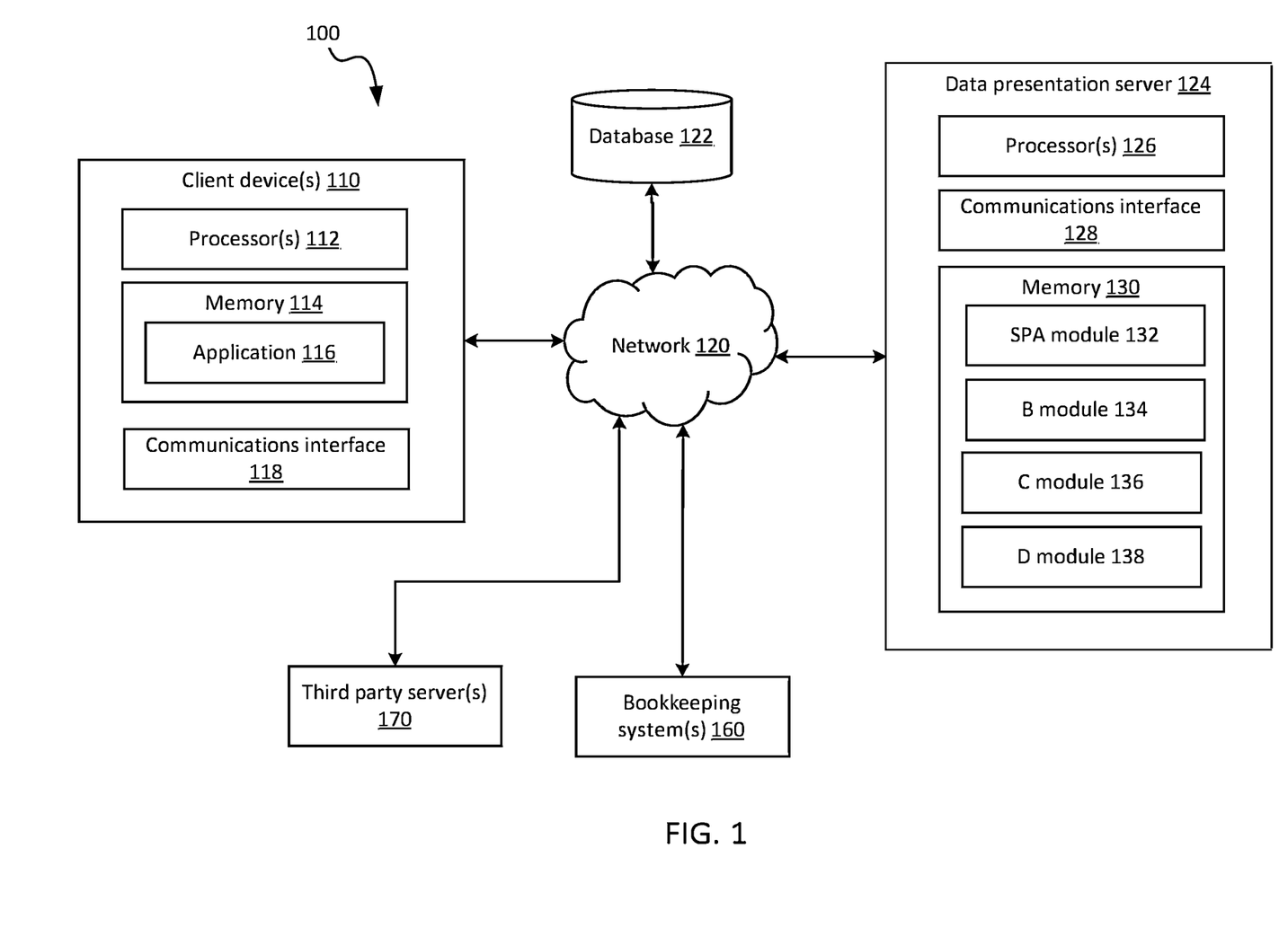
FIG. 1 is a block diagram of a system for providing an interface for intuitive navigation of stored data by a user of a user device, according to described embodiments.

FIG. 1 is a block diagram of system 100 for provide an interface enabling intuitive navigation of stored data by a user of a user device 110, according to some embodiments. The system 100 of FIG. 1 provides means for implementing the method illustrated in process flow diagram FIG. 4, and means for implementing the graphical user interfaces illustrated in FIGS. 2, 3a, 3b, & 3c.

As illustrated, the system 100 may comprise one or more client device(s) 110, external database 122, data presentation server 124, one or more bookkeeping system(s) 160 and/or one or more third party server(s) 170 in communication over network 120.

Client device 110 may comprise a mobile or handheld computing device such as a smartphone or tablet, a laptop, or a PC, and may, in some embodiments, comprise multiple computing devices. The client device 110 may comprise one or more processor(s) 112, memory 114 and/or communications interface 118. The processor(s) 112 may comprise one or more microprocessors, central processing units (CPUs), application specific instruction set processors (ASIPs), application specific integrated circuits (ASICs) or other processors capable of reading and executing instruction code. The processor(s) 112 may be configured to receive stored instructions (i.e., program code) from memory 114, which when executed by the processor(s) 112 may cause the client device 110 to function according to the described embodiments. Client device 110 comprises one or more display screens, each of the one or more display screens being configured to display the graphical user interface illustrated in FIGS. 2, 3a, 3b, & 3c in implementing a method such as that illustrated in FIG. 4. Wherein functionality determining arrangement and content of the graphical user interface is provided by the processor hardware 112, and the memory hardware 114, which may be cooperating with data presentation server 124 and bookkeeping system 160. The graphical user interface may be an application 116 stored on the memory 114, or part of an application 116 stored on the memory 114. The application 116 may be a single page application served by the data presentation server 124 to the client device 110 over the network 120 and displaying content (i.e., graph data entries) from, or based on, data obtained from the bookkeeping system 160.

The memory 114 may comprise application 116 which comprises computer executable code, which when executed by the one or more processors 112, is configured to allow client device 110 to facilitate the intuitive navigation of data displayed on a screen of the client device 110. The communications interface 118 facilitates communications with components of the communications interface 118 across the network 120, such as: database 122, data presentation server 124, bookkeeping system(s) 160 and/or third party server(s) 170. The communications interface 118 may comprise a combination of network interface hardware and network interface software suitable for establishing, maintaining and facilitating communication over a relevant communication channel.

The network 120 may include, for example, at least a portion of one or more networks having one or more nodes that transmit, receive, forward, generate, buffer, store, route, switch, process, or a combination thereof, etc. one or more messages, packets, signals, some combination thereof, or so forth. The network 120 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, some combination thereof, or so forth.

The database 122 may form part of or be local to the system 100, or may be remote from and accessible to the system 100, for example, via the communications network

120. The database 120 may be configured to store data associated with the system 100. The database 120 may be a centralised database. The database 120 may be a mutable data structure. The database 120 may be a shared data structure. The database 120 may be a data structure supported by database systems such as one or more of PostgreSQL, MongoDB, and/or ElasticSearch. The database 120 may be configured to store a current state of information or current values associated with various attributes (e.g., "current knowledge"). For example, data presentation server 124 may be configured to serve single page applications to the client device 110. Single page applications may comprise graphical user interfaces such as that illustrated in FIGS. 2, 3*a*, 3*b*, & 3*c*. The graphical user interfaces of single page applications provide a mechanism for a user of a client device to navigate, manipulate, and/or interact with, data stored by the bookkeeping system 160. Wherein the data stored by the bookkeeping system 160 may comprise, inter alia, transaction data such as a transaction feed representing a series of transactions in which the user (or a business or other legal entity on behalf of which the bookkeeping system 160 is providing an online bookkeeping service).

In some embodiments, the data presentation server 124 may comprise one or more processors 126 and memory 130 storing instructions (e.g., program code) which when executed by the processor(s) 126 causes the system 100 to provide an interface enabling intuitive navigation of stored data by a user of a user device and/or to function according to the described methods. The processor(s) 126 may comprise one or more microprocessors, central processing units (CPUs), application specific instruction set processors (ASIPs), application specific integrated circuits (ASICs) or other processors capable of reading and executing instruction code.

In some embodiments, the data presentation server 124 may operate in conjunction with or support one or more external devices, such as client device 110, database 122, bookkeeping system(s) 160 and/or third party server(s) 170, to manage the provision of an intuitive navigation graphical user interface for stored data.

The memory 130 may comprise one or more volatile or non-volatile memory types. For example, memory 130 may comprise one or more of random access memory (RAM), read-only memory (ROM), electrically erasable programmable read-only memory (EEPROM) or flash memory. Memory 130 is configured to store program code accessible by the processor(s) 126. The program code comprises executable program code modules. In other words, memory 130 is configured to store executable code modules configured to be executable by the processor(s) 126. The executable code modules, when executed by the processor(s) 126 cause the system 100 to perform the functionality according to the described embodiments, as described in more detail below. Memory 130 may comprise SPA module 132, which stores and serves single page applications (SPAs) to user devices. B module 134, which may, for example, check credentials to enable users to login to the service. C module 136 and/or D module 138 may provide further functionality to users of the system.

Figure 2:
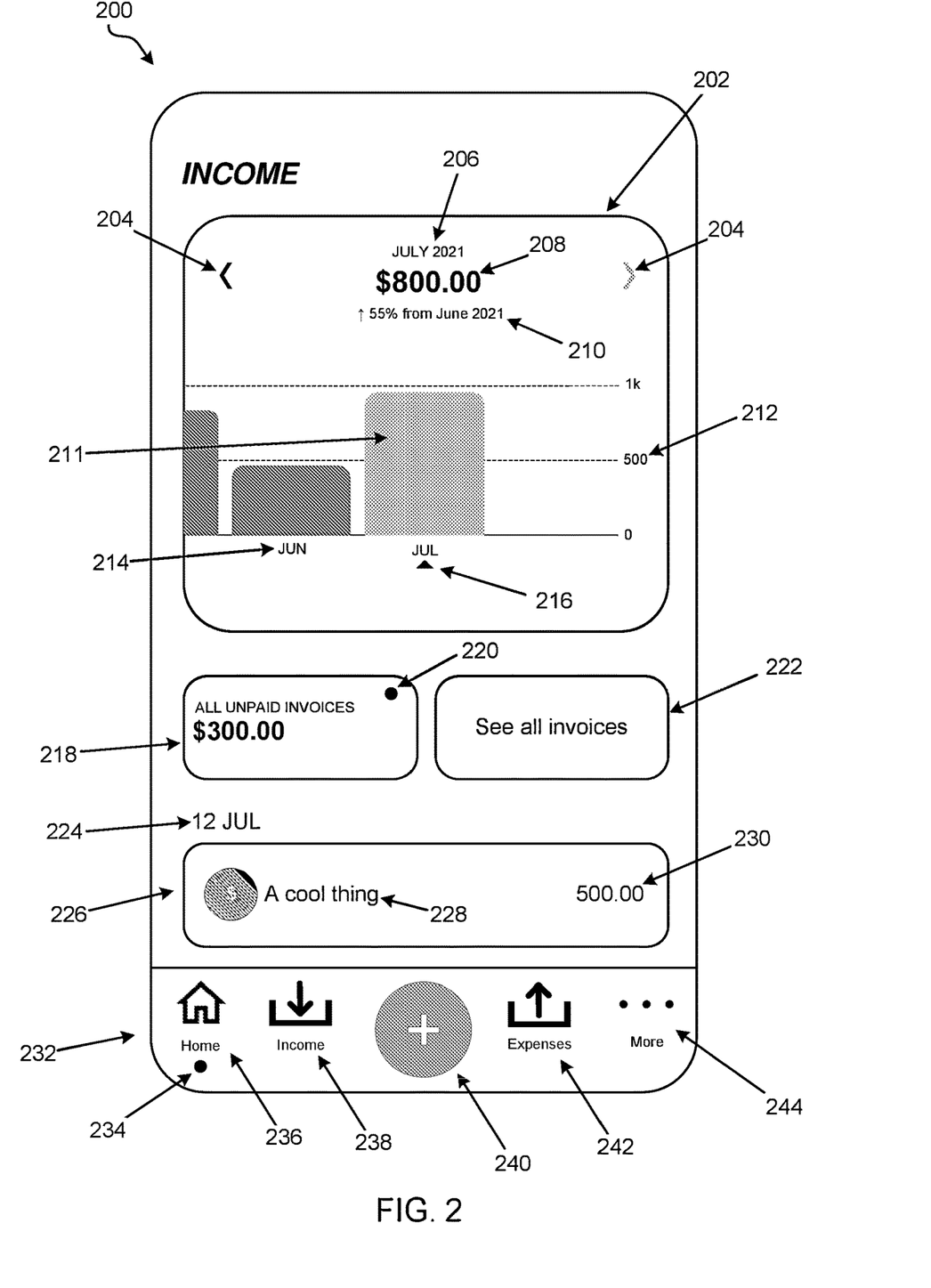
FIG. 2 is an image of a graphical user interface for intuitive navigation of stored data by a user of a user device, according to described embodiments.

FIG. 2 is an image depicting a graphical user interface for intuitive navigation of stored data by a user of a user device, according to some embodiments.

Figure 3A:
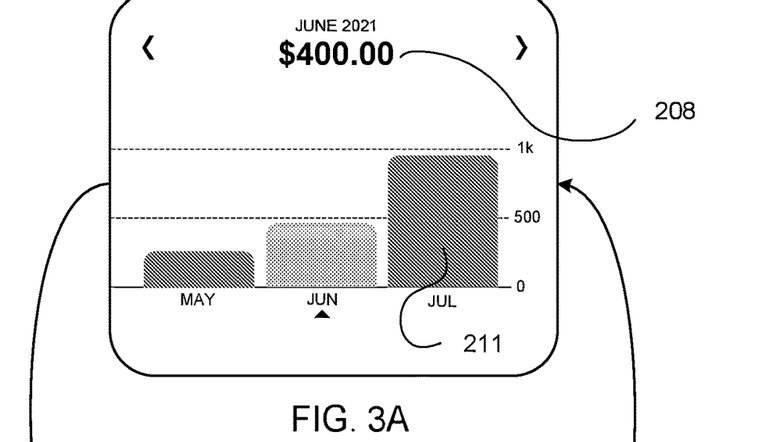
FIGS. 3a, b and c are images depicting the scaling of graph visual elements, according to described embodiments.
Figure 3B:
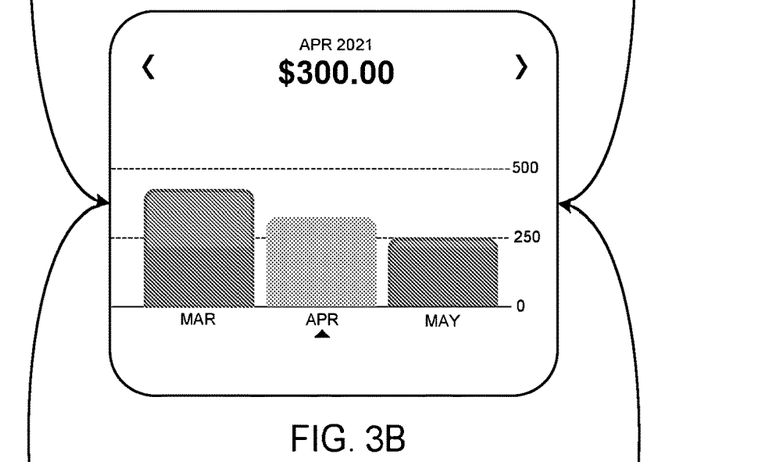
Figure 3C:
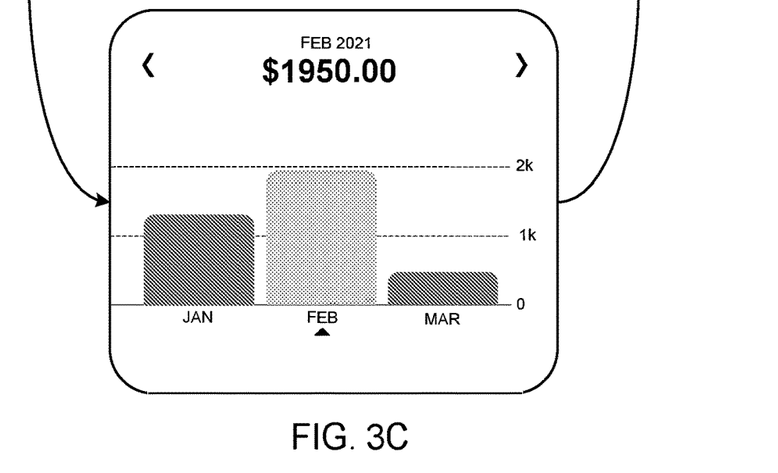

FIGS. 3*a*, 3*b* and 3*c* are images of different scales as dynamically applied to the graph visual elements, according to some embodiments.

Figure 4:
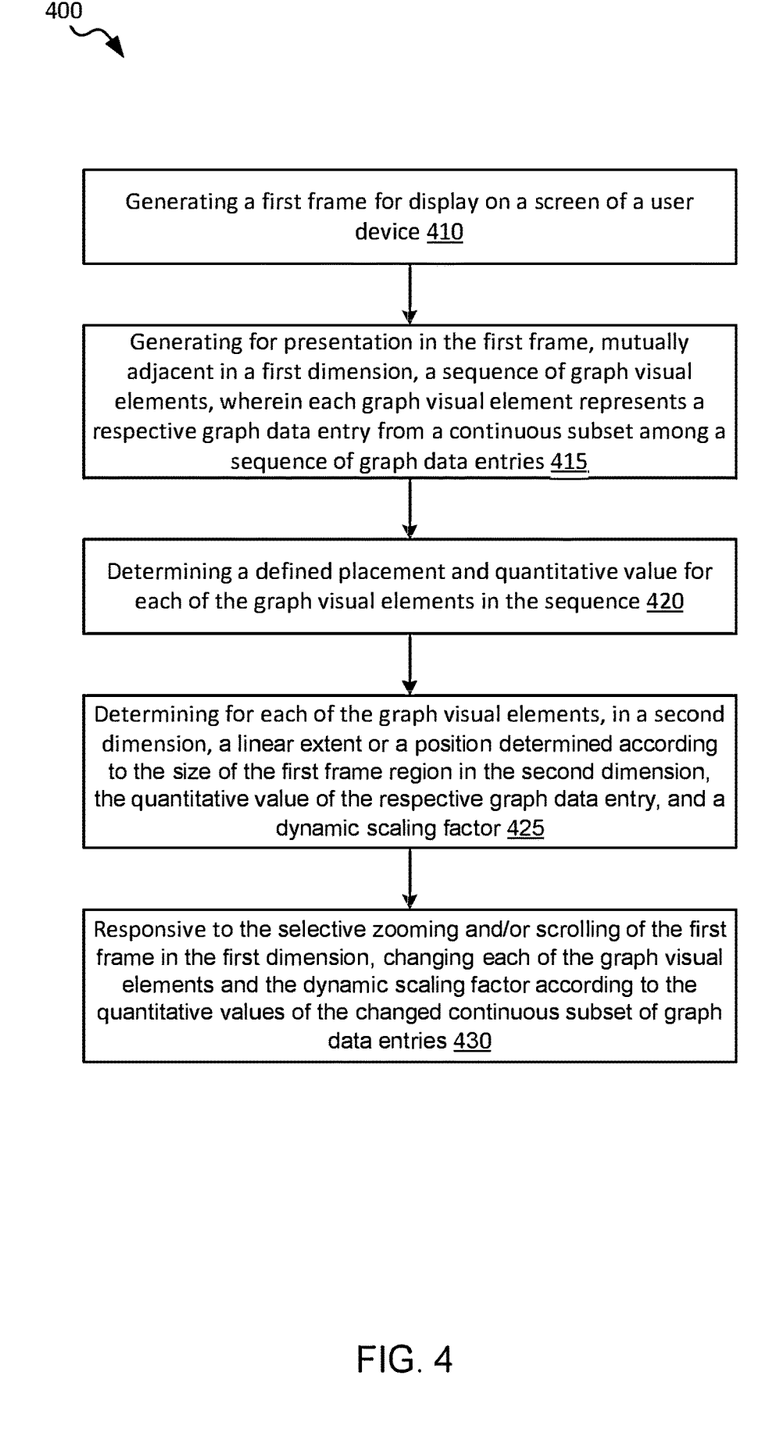
FIG. 4 is a process flow diagram of providing an interface enabling intuitive navigation of stored data by a user of a user device, according to described embodiments.

FIG. 4 is a process flow diagram of generating, displaying and dynamically scaling the graph visual elements according to some embodiments.

The process of FIG. 4 relates to the stored data domain and the display screen domain, and provides a mechanism for the illustration of information from the stored data domain in the display screen domain. In embodiments, the display screen domain is interactive via a graphical user interface, and so elements of the display screen domain may be selectable, scrollable, and/or scalable. The display screen domain is a manifestation of processing performed by the graphical user interface. The process of FIG. 4 is described below with reference to FIG. 2 and FIGS. 3*a*, 3*b*, & 3*c*.

An operating system of the user device 110 is responsible for detecting user interactions with the graphical user interface (GUI), and feeding data representing the detected user interactions to the GUI so that the GUI can respond according to the GUI configuration.

The graph data entries belong to the stored data domain. The stored data domain refers to data as stored and transferred between devices of the system 100, as distinct from the manifestation of the stored data that is rendered in the GUI. The graph data entries may be stored in non-volatile storage by the bookkeeping system 160, which entries are accessible to the client device 110 running an SPA served thereto by SPA module 132 of data presentation server 124. The processing instructions implementing the SPA may include instructions for composing and transmitting data access queries to the bookkeeping system 160. The GUI may make values from or based on the graph data entry visible as numbers or text strings present in the display screen domain. The GUI translates values from the graph data entries in the stored data domain into graph visual elements present in the display screen domain. An exemplary graph visual element is a bar of a bar chart. An exemplary graph data entry is a numerical value. The numerical value may be a composite value composed of component entries grouped according to time period.

A first step 410 of the process flow of FIG. 4 comprises generating a first frame 202 for display on a screen 200 of a user device. Content for the first frame is generated at step 415, generating for presentation in the first frame 202, mutually adjacent in a first dimension, a sequence of graph visual elements 211. For example, the sequence of graph visual elements 211 are bars of a bar chart, each representing a composite property or parameter for a particular value range of a sequence (e.g., summation of transactions assigned timings within specified time periods). The sequence may be a time series. The x-axis may represent a progression of time, and the y-axis a progression of value. The graph may be selectively scrollable in the x-axis, in response to which the dynamic scaling factor is calculated for the y-axis. Tapping a scroll button or scrolling causes a shift in the rendered graph visual elements and a corresponding re-calculation of the y-axis scaling factor. The time series is a segmentation of a relatively longer time period into a plurality of relatively shorter time periods. The relatively shorter time periods may be equal, such as a day or number of days, or a week or number of weeks. The relatively shorter time periods may be discrete portions of the Gregorian calendar, such as one month or an integer multiple of months, such as 3 months. In the case of an integer multiple of months, such as 3 months, the start/end points may be fixed within the calendar year or within a (configurable) financial year, so that the relatively shorter time periods are quarters within the calendar or financial year.

Scrolling may be initiated by user actions including a swipe gesture in the first dimension or selection of a scrolling button. As a further alternative, the GUI may feature a date picker on the graph/bar chart, which responds to a user selection action such as a touchscreen point gesture or a cursor selection at a visual graph element that is currently rendered but non-selected, by scrolling the bar chart in the x-axis (the first dimension) so that the non-selected visual graph element is central in the first frame in the first dimension and becomes the selected visual graph element. The scrolling thus initiated may result in a change in the greatest quantitative value represented by the rendered graph data entries, which results in a dynamic re-scaling of the y-axis (that is, a change in the dynamic scaling factor).

The graph data entries form a sequence, so that each graph data entry has a defined placement in the sequence. The placement is stored implicitly or explicitly in the stored data domain and in the display screen domain is reflected in the placement of the respective graph visual elements 211 in the first frame 202. As illustrated in FIG. 2, each of the graph visual elements 211 rendered within frame 202 represents a summation of individual transactions falling within a respective time period (e.g., a month) from a continuous sequence of consecutive time periods.

Optionally, the graphical user interface uses the currently illustrated subset of graph data entries to pre-load from the server one or more adjacent graph data entries either side so that a next user scrolling action may be responded to quickly and without requiring a data load operation from the server. For example, the sequence of graph data entries are stored on a server and loaded onto the user device by the graphical user device on demand according to the selective zooming and/or scrolling of the first frame in the first dimension, wherein graphical user interface is configured, while the graph visual elements representing the continuous subset of graph data among the sequence of graph data entries are illustrated in the first frame, checking whether a predefined number of graph data entries either side of the continuous subset are loaded on the user device, and if they are not loaded on the user device, loading onto the user device any missing graph data entries from among the predefined number of graph data entries either side of the continuous subset. Alternatively, the checking step may be left out, so that the GUI (or the application to which the GUI belongs) simply loads the graph data that is required for rendering the first frame (and the composite entries for the second frame).

A number of graph data entries is greater than a number of graph visual elements 211 that are displayed simultaneously within the first frame 202. However, the first frame 202 is zoomable and scrollable in the first dimension, so that the subset of graph data entries illustrated by corresponding graph visual elements in the first frame is controllable by a user, by user interaction with the first frame 202 in the graphical user interface. In the specific example of FIG. 2, three graph visual elements 211 are rendered in the frame 202, representing a subset of monthly values from a sequence of greater than three monthly values. The value in FIG. 2 is a summation of income during the month, i.e., a summation of incoming transactions falling within the month in question. The graph visual elements 211 provide a pictorial representation of values for the respective months. A text representation 208 of the value for a selected month may be rendered along with a label 206 and optionally also a change indicator 210 quantifying a relative change in the value using the value represented by the previous graph visual element in the sequence (i.e., the preceding graph data entry in the sequence) as a baseline. It is noted that the time period represented by each bar in a bar chart is configurable by a user in accordance with a zooming in or out user interaction with the first frame region.

As shown at step 420, when the graphical user interface is rendered, the graph visual elements to display is determined and the quantitative values obtained from the corresponding graph data entries. A set of rules may be included as part of the SPA for determining which graph visual elements to render at first rendering, for example, graph visual elements 211 representing the n most recent time periods, wherein n is determined by a size of the first frame 202 which is in turn determined by a size of the display screen 200, and a default size per graph visual element 211.

At step 425, a linear extent or position in a second dimension is determined for each of the graph elements, the second dimension being orthogonal to the first dimension, and both the first and second dimensions being the plane of the display screen 202. In the example illustrated in FIG. 2, the quantitative value of the graph data entry per month is illustrated by a bar on a bar chart (bar chart being a specific example of a graph), the linear extent of the bar corresponding to the quantitative value. In more detail, the linear extent of the bar per month is determined by the size in the second dimension of the first frame in which the bar chart is rendered (and specifically by a proportion of the first frame in the second dimension that is to be occupied by the graph), in other words, a size of the graph in the second dimension, the quantitative value of the graph data entry, and a scaling factor. The scaling factor is, for example, a number of pixels per unit of quantitative value. The scaling factor is dynamic, and is calculated for each rendering of the graph in dependence upon the quantitative values represented by the rendered graph visual elements.

In a particular example, the first dimension may be the left to right or horizontal dimension of the display screen, and the second dimension may be the down to up or vertical dimension of the display screen (for example, as illustrated in FIG. 2). Under control of the operating system of the user device and the GUI, rotation of the user device may cause switching of the first and second dimensions with respect to the edges of the display device, so that the long edge of FIG. 2 is aligned with the first dimension, and the short edge the second dimension.

As shown in step 430, the graph data entries belonging to the continuous subset of graph data entries represented by graph visual elements changes according to user interaction with the first frame 202 of the GUI. In other words, the selection of graph data entries whose quantitative values are represented by graph visual elements is changeable according to user actions such as scrolling or resizing. For example, user interaction may be by a scrolling input to a touchscreen (wherein the touchscreen is the display screen). Alternatively, the first frame may comprise scrolling buttons 204, wherein user selection of a scrolling button via an input method keyboard/mouse/trackpad/touchscreen causes scrolling of the graph, i.e., changing the subset of graph data entries that are illustrated by graph visual elements. The scrolling input may be a drag gesture in the first dimension, and wherein a direction of the scrolling input determines how the subset of graph data entries illustrated by corresponding graph visual elements in the first frame is changed (i.e., scroll forward gesture moves forward through the sequence of graph data entries and scroll backward gesture moves backward through the sequence of graph data entries).

User interaction may be by a scaling input to a touchscreen (wherein the touchscreen is the display screen). The scaling input may be a two-touch gesture pinching inward in the first dimension or spreading outward in the first dimension, wherein the change in scaling in the first dimension determines whether more or fewer graph visual elements are illustrated within the first frame.

The scrolling and scaling inputs both change membership of the subset of graph data entries illustrated by corresponding graph visual elements in the first frame. The scrolling and scaling inputs are in a first dimension; the first dimension being a dimension along which the graph visual elements are adjacently arranged. This is intuitive: a drag gesture along the horizontal or x-axis of a graph causes scrolling through graph data entries.

As described above, scaling in the first dimension may be controllable by a user. The second dimension may be considered the vertical or y-axis of a graph. The graph visual elements may be bars at a position in the first dimension defined by their placement in the sequence of graph data entries, starting from a common baseline (the x-axis), and extending a distance in the second dimension determined by a magnitude of the quantitative value of the graph data entry represented by the graph visual element.

In order to determine the extent of each graph visual element in the second dimension (i.e. a height or length of each bar of the bar chart), three factors are taken into consideration: the size of the first frame region in the second dimension (which may be a number of pixels or pixel lines), the magnitude of the quantitative value of the graph data entry being represented, and a dynamic scaling factor. The dynamic scaling factor is determined dynamically in accordance with the magnitudes of the quantitative values of the graph data entries being represented in the first region at a time. Thus, the dynamic scaling factor changes as the user scrolls along the visual graph elements in the first dimension (i.e. changes which of the graph data entries are illustrated), and/or scales the visual graph elements in the first dimension (i.e. changes how many graph data entries are illustrated at a time). The dynamic scaling factor may be determined according to a greatest magnitude of the quantitative values of the graph data entries being represented by graph visual elements in the first frame at a time. The dynamic scaling factor may be determined to enable the said greatest magnitude quantitative value to fit in the first frame in the second dimension. The first frame is a region of the window to be occupied by the graph (i.e. the portion of a graph being instantaneously illustrated). If the first frame is sized 1000 pixels in the first dimension×1200 pixels in the second dimension, and a predefined fixed number of pixels is to be subtracted, for example to allow space for axes labelling, then a remaining 1100 pixels are available for the graph visual elements. The scaling factor may be given by the greatest magnitude quantitative value divided by the second dimension pixels available for graph visual elements. Alternatively, a series of fixed values may be defined, for example, multiples of ten, multiples of 50, multiples of 100, multiples of 250, multiples of 1000, and the scaling factor given by the next of the series of fixed values above the greatest magnitude quantitative value, which fixed value is divided by the number of pixels to give a scaling factor. Wherein the scaling factor is a quantitative value per pixel, so dividing a quantitative value by the scaling factor gives a number of pixels.

FIGS. 3a, 3b, & 3c illustrate in more detail the function of the dynamic scaling factor. FIGS. 3a to 3b illustrate states of the first frame 202 of FIG. 2 with different rendered contents, representing the rendering of frame 202 at different points in time. The arrows to the side of FIGS. 3a-3c represent progression through time, wherein progression between states is according to selective scrolling by a user and may be in either direction, e.g., from 3a to 3b to 3c, or from 3c to 3b to 3a, or other transitions as represented by the arrows.

FIG. 2 illustrates more of the graphical user interface apart from the first frame, whereas FIGS. 3a to 3c illustrate the first frame 202 in isolation. In the example of FIG. 2, the first frame is titled "Income" which is a descriptor of the time series represented by the graph in the first frame, equally a descriptor of the quantitative values of the graph data entries represented in the graph within the first frame 202, the graph being a bar chart. Scrolling buttons 204 are illustrated, which are selectable by a user interaction to scroll the bar chart through time, to change the subset of graph data entries that are rendered in the first frame 202 by graph visual elements 211. The scrolling buttons 204 are optional, noting that scrolling may be initiated by a scrolling gesture such as a drag gesture in the first dimension. A text box 208 recites a quantitative value of a selected graph visual element 211 and a further text box 210 provides further contextual information about the selected graph visual element 211. Text boxes 208 and 210 are optional. A scale of the graph, determined by the dynamic scaling factor discussed in more detail below, is represented by y-axis labels 212. X-axis labels 214 indicate a defined time period for each graph visual element 211. An icon 216 provides a further indication (beyond a colour change) of a selected graph visual element 211. A third frame 218 details further information pertaining to the time period for the selected graph visual element 211, in this case a value of unpaid invoices from the time period. An icon 220 may change colour depending on the content of the frame 218, wherein a non-zero value is reflected by a red icon 220 and a zero value is represented by a red icon. A user selectable button 222 navigates away from the graphical user interface and into a document repository navigator interface for viewing invoices from the time period of the selected graph visual element 211.

A second frame 226 occupies a second frame region of the window. The second frame illustrates, for a selected graph data entry among the sequence of graph data entries, at least a portion of a plurality of entry components of the selected graph data entry, the plurality of entry components being individually labelled quantitative values which are combined to calculate the quantitative value of the selected graph data entry.

The second frame 226 is a window to a list of transactions, in this case transactions classified as income, and being dated within the time period of the selected visual graph element 211. The transactions may be referred to as entry components since they are individual elements having a quantitative value, which quantitative values are combined (eg. summed) to determine the quantitative value of the relevant graph data entry. The date of the displayed transaction is illustrated at 224, and a value of the transaction is illustrated at 230. The list is a filtered list of transactions, filtered according to the selected visual graph element and the time period it represents.

At the bottom 230 of the graphical user interface is a menu bar for navigating the online bookkeeping system more broadly than the SPA of the graphical user interface, and for switching between different time series of data to display in the graphical user interface. The menu bar comprises user selectable icons. Icon 236 returns to a home screen. Icons 238 and 242 toggle between an income time series and an expenditure time series. A button 240 enables addition of a new time series. For example, both income and expenditure may be displayed at a time as interspersed time series, so that the graph visual elements are arranged: income for first time period, expenditure for first time period, income for next time period after first time period, expenditure for next time period after first time period, and so on. Icon 244 leads to further configuration options.

Among the rendered graph visual elements, one is selected at a time. The selected element is selectable by a user by an input such as a touchscreen point gesture or a mouse selection at the graph visual element. Alternatively, the selected element may be defined by a rule in the processing logic of the SPA to which the GUI belongs, for example, a central visual graph element among plural rendered visual graph elements (in the case of an even number being rendered a more recent of the central pair may be selected). For the selected element, the quantitative value of the corresponding graph data entry is detailed in text/numerical form at 208, along with a label 208 defining the graph data entry among the sequence, such as a time period, and optionally also further contextual information 210 such as a change from the quantitative value of the preceding graph data entry in the sequence. The further contextual information is not included in the examples of FIGS. 3a to 3c. In addition, and as shown in FIG. 2, a second frame 226 illustrates a transaction feed of individual transactions from within a time period represented by the selected graph visual element. The transaction feed may be scrollable by scrolling actions in the second dimension. The quantitative value 208 represented by the selected graph visual element 211 is a composite value obtained by summing all individual transactions belonging to the represented time period. The individual transactions are displayed as a scrollable list within the second frame 226. Each individual transaction is represented by an icon, a descriptor label 228 which may be a name of the other party in the transaction (i.e., assuming a two-party transaction, the name of the party that is not the user of the online bookkeeping service), and a numeric value 230 being a financial value of the transaction. The icon may indicate whether the transaction is an income or expenditure by a different colouring or a different shape or icon.

At FIG. 3a, the selected graph visual element is labelled "JUN", which is an abbreviated version of a descriptor "June 2021" describing a time period represented by the relevant graph data entry. In other words, transactions (entry components) occurring during a time period are combined to calculate the quantitative value represented by the linear extent of the graph visual element labelled "JUN" and recited in text form at the top of frame 202 with the full descriptor "June 2021". At FIG. 3b, the selected graph visual element is labelled "APR" and it can be seen from the text form at the top of the frame that the represented time period is "Apr 2021" being April 2021. Likewise, At FIG. 3c, the selected graph visual element is labelled "Feb" and it can be seen from the text form at the top of the frame that the represented time period is "Feb 2021" being February 2021.

The FIGS. 3a to 3c illustrate frame 202 in three different states. The states each show a different subset of graph data entries represented by graph visual elements. At FIG. 3a, graph data entries defined by time periods May 2021, June 2021, and July 2021, are represented by visual graph elements. At FIG. 3b, graph data entries defined by time periods March 2021, April 2021, and May 2021, are represented by visual graph elements. At FIG. 3c, graph data entries defined by time periods January 2021, February 2021, and March 2021, are represented by visual graph elements. The quantitative values of the graph data entries may be as follows:

January 2021, $120
February 2021, $1950
March 2021, $40
April 2021, $300
May 2021, $250
June 2021, $40
July 2021, $800.

For example, each quantitative value is a composite value calculated by combining all income transactions falling within the time period defined by each graph data entry. The second frame 226 displays a scrollable list of component entries (each representing an individual transaction) falling within the defined time period.

A state transition occurs between FIGS. 3a and 3b, initiated by a user scrolling action. The user scrolling action may be a scrolling gesture (i.e., a drag or swipe in the first dimension) on a touchscreen on which the GUI is being displayed, or a touchscreen point gesture on a scrolling button such as illustrated in the top left and top right corners of the frame 202, or just tapping in the vicinity of either edge (in the first dimension) of the first frame. The state transition causes the subset of graph data entries that are illustrated by graph visual elements to change, from May 2021, June 2021, July 2021 in FIG. 3a, to March 2021, April 2021, May 2021 in FIG. 3b. The scrolling is backward through time, which is associated with a scrolling gesture from left to right on the frame 202, or a selection of the scrolling button (the <arrow) at the top left corner of the frame 202. The extent and speed of the scrolling gesture may determine the extent of the shift in subset of rendered graph data entries, wherein longer scrolling gestures cause a greater shift than shorter scrolling gestures, and wherein scrolling gestures above a speed threshold are taken to be an instruction to shift the subset by more than the extent of a single frame (i.e. by more than three months in the example of FIG. 3a). In the transition from FIG. 3a to FIG. 3b, the shift in the subset is by two months.

The scrolling action changes the subset of graph data entries that are illustrated and so changes the scale of the graph in the second dimension (i.e., the y-axis). The display screen 200 size and the size of the first frame 202 in the second dimension does not change. That is, the available space for the graph visual elements in the second dimension is unchanged from FIG. 3a to FIG. 3b. The available space for the graph visual elements in the second dimension is calculated by the GUI and is determined by the size of the first frame 202, which may be somewhat fixed and somewhat configurable by a user action, for example a user may resize the first frame 202 and the second frame 226 to take up relatively more or less space within the display screen, but there may be maxima and minima for each frame and in each dimension. The greatest quantitative value among the subset of graph data entries that are to be rendered in the frame 202 is identified. The dynamic scaling factor may be calculated by fitting the said greatest quantitative value into the available space for the graph visual elements in the second dimension. For example, if the available space for the graph visual elements in the second dimension is 356 pixels, and the said greatest quantitative value among the subset is $178 k, then the scaling factor is 356 px/$178 k=2 pixels per $1 k.

Noting that the scaling factor could be calculated reciprocally to the first example, for example the scaling factor is $178 k/356 px=$0.5 k/pixel. Alternatively, there may be a series of fixed values that are predefined and stored in the processing logic of the SPA, for example, multiples of 10, multiples of 50, multiples of 100, multiples of 1000, or a series such as 1, 5, 10, 50, 100, 250, 500, 1000, 2000, 5000, 10000 etc. The series of fixed values are configurable at design time of the SPA. The scaling factor may be determined by identifying the greatest quantitative value among the subset of graph data entries that are to be rendered in the frame 202, and then identifying the smallest fixed value exceeding the identified greatest quantitative value.

In the example of FIG. 3a, the greatest quantitative value among the subset of graph data entries that are to be rendered is July at $800, and the smallest fixed value exceeding $800 is 1000, so the available space in the second dimension for graph visual elements (Y pixels) is divided by the said smallest fixed value (1000) to give a scaling factor of Y/1000 in units of pixels per $.

Following the transition to FIG. 3b, the graphical user interface re-calculates the dynamic scaling factor using processing logic of the SPA. The greatest quantitative value among the subset of graph data entries that are to be rendered is March at $400, and the smallest fixed value exceeding $400 is 500, so the available space in the second dimension for graph visual elements (Y pixels) is divided by the said smallest fixed value (500) to give a scaling factor of Y/500 in units of pixels per $.

Following the transition to FIG. 3c, the graphical user interface re-calculates the dynamic scaling factor using processing logic of the SPA. The greatest quantitative value among the subset of graph data entries that are to be rendered is February at $1950, and the smallest fixed value exceeding $1950 is 2000, so the available space in the second dimension for graph visual elements (Y pixels) is divided by the said smallest fixed value (2000) to give a scaling factor of Y/2000 in units of pixels per $.

As illustrated in the states of the first frame at FIG. 3b and FIG. 3c, the same graph data entry, that representing March 2021 indicated by the label "MAR" in the Figures, changes in the dynamic scaling factor from one state to the next cause the linear extent of the graph visual element to change by a factor of 4 from one state to another, in spite of the quantitative value being represented being unchanged.

Figure 5A:
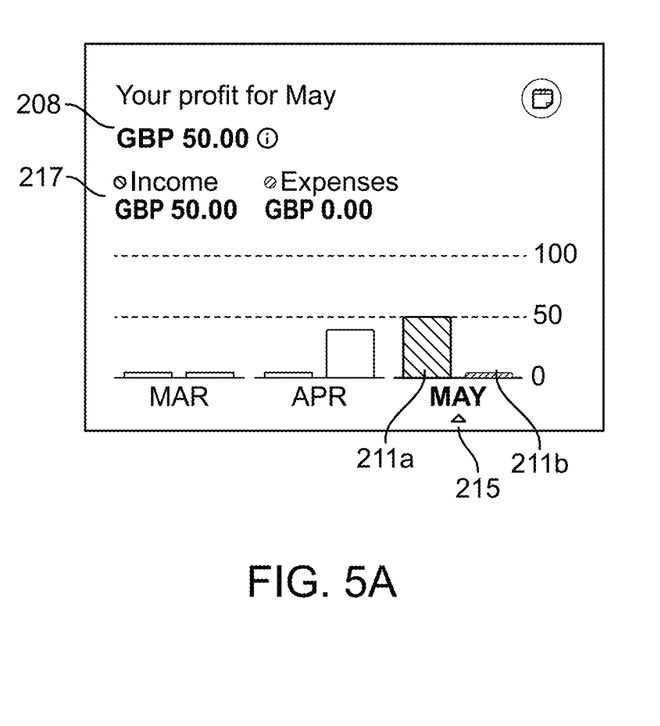
FIGS. 5a & 5b illustrate a graphical user interface.
Figure 5B:
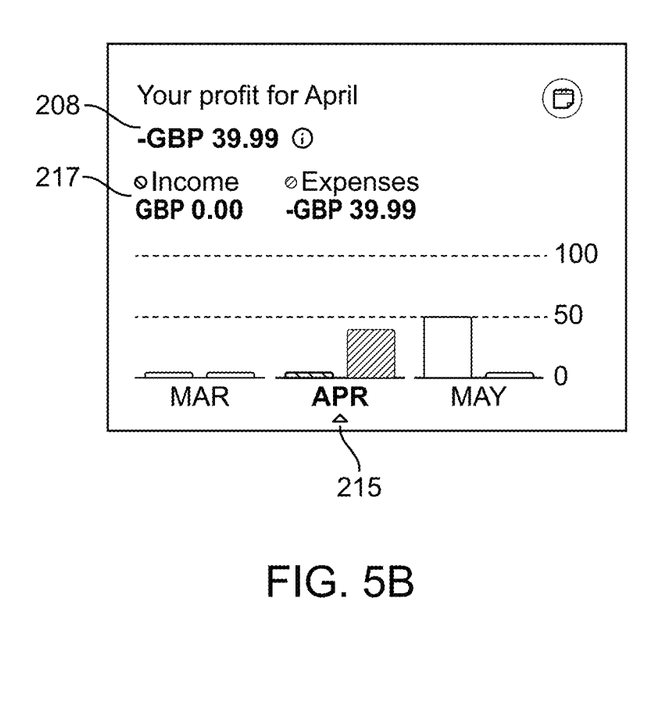

FIGS. 2 & 3a-3c illustrate an example in which the graph data entries define a single time series. However, embodiments may render graph data entries defining two or more time series. In particular, for each of a continuous series of time periods there is a graph data entry in each of the two time series. A two time series example is illustrated in FIGS. 5a & 5b, in which a text representation 208 of the value for a selected time period (month) (selected status being indicated by icon 215 and/or by differential shading of the relevant visual graph elements) is rendered at the top of the first frame, the value being a combination such as a summation of the values for the selected time period from each of the two time series. Text representations 217 of the values for the selected time period from the individual time period are also rendered, in the example of FIG. 5a as part of a legend indicating colour/shading used for the graph visual element 211a 211b corresponding to the respective time series.

FIG. 5b illustrates the same SPA as in FIG. 5a, but in which a user input has changed the time period having selected status, from May to April, as indicated by the change in differential shading and movement of the icon 215. Furthermore, the text representation 208 of the value for the selected time period is changed according to the change in selected time period. Furthermore, the text representations 217 of the values for the selected time period from each of the two time series are updated according to the change in selected time period.

Figure 6A:
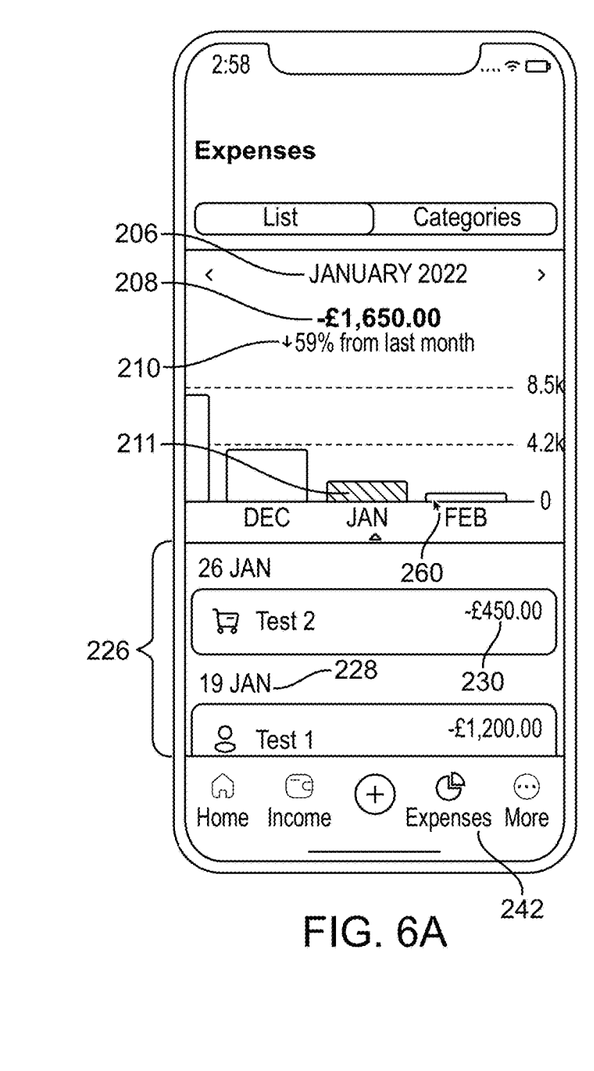
FIGS. 6a to 6c illustrate a sequence of screenshots of the GUI.
Figure 6B:
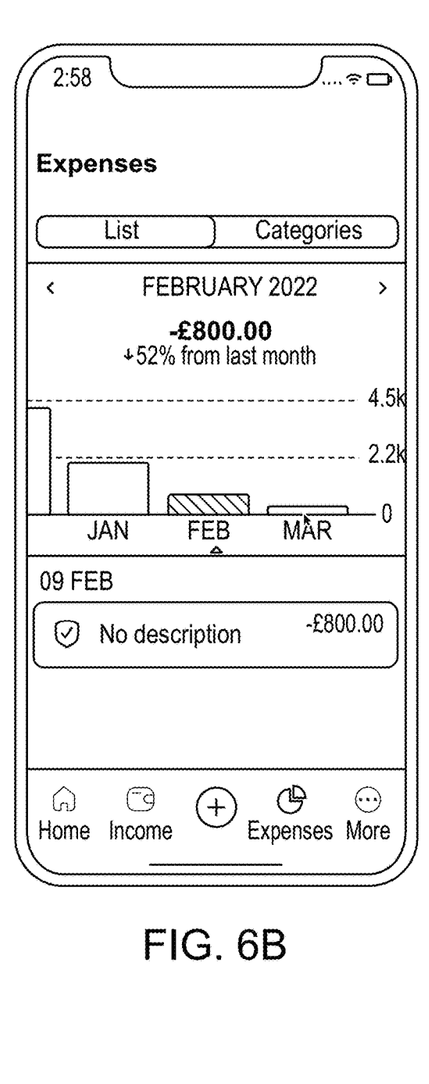
Figure 6C:
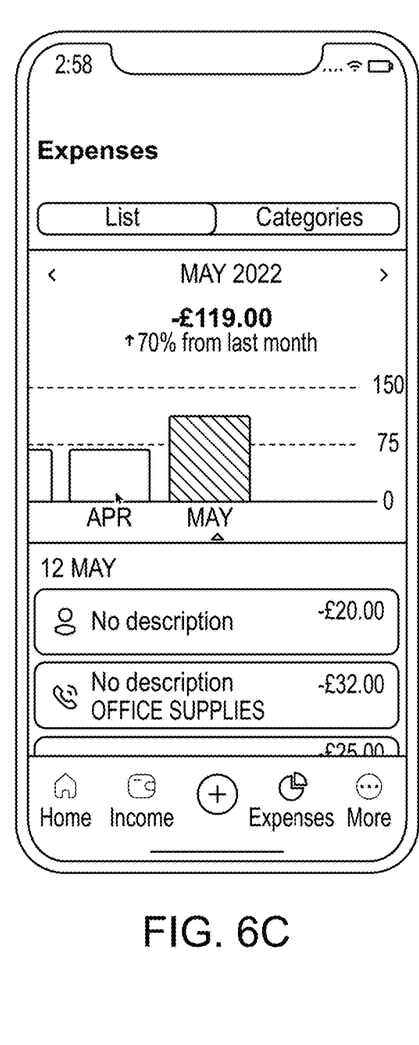

FIGS. 6a to 6c illustrate a sequence of screenshots of a graphical user interface. As illustrated in FIG. 6a, the graph visual element for the selected month 211 is represented by a label 206 at the top of the first frame, and indicated by differential shading of the graph visual elements and by a triangular icon underneath the graph visual element. A text representation 208 of the graph data entry of the selected graph visual element 211 is also included at the top of the first frame. A change indicator 210 is a rendered text string with icon representing a change relative to the preceding entry in the time series. The expenses button 242 is selected and so the time series (i.e., the graph data series) is monthly expenses. The second frame 226 renders a scrollable list in which individual expense transaction are listed by a descriptor 228, for example extracted from bank feed data, and a value 230, for example extracted from bank feed data. The illustrated/rendered graph visual elements are November (at the left hand edge of the first frame), December, January, and February. The greatest quantitative value of the rendered data graph entries is November, and the y-axis scaling is determined by rounding up to the nearest 0.1 k above the greatest quantitative value, and dividing that by the number of available pixels, to arrive at a scale in $/pixel. Lines at fixed value in the y-axis are illustrated at 100% and 50% of the rounded up greatest quantitative value.

A transition to the screenshot of FIG. 6B is initiated by a user interaction with the GUI. In the particular example of FIGS. 6a to 6c, a user controls a cursor 260, for example, by pressing a stylus on a touchscreen display, by pressing a finger on a touchscreen display, or by another input mechanism. The user controls the cursor to be located at the graph visual element for March, and a user selection is made, for example by a cursor press, a double tap, or some other user interaction that the GUI processes as a user selection. The user selection changes the selected graph visual element 211 from January to February, which causes the graph to scroll from right to left and thus is a scrolling action. The illustrated/rendered graph visual elements are December (at the left hand edge of the first frame), January, February, and March. The greatest quantitative value of the rendered data graph entries is December, and the y-axis scaling is determined by rounding up to the nearest 0.1 k above the greatest quantitative value, and dividing that by the number of available pixels, to arrive at a scale in $/pixel. Lines at fixed value in the y-axis are illustrated at 100% and 50% of the rounded up greatest quantitative value. The y-axis is dynamically re-scaled from FIG. 6A to FIG. 6B.

In the transition from the state shown in FIG. 6A to the state shown in FIG. 6B, and generally in transitioning the first frame from a first rendered state to a second rendered state in response to a user interaction selectively initiating a scaling and/or scrolling of the graph in the first dimension, the change in rendered state may be sudden/immediate or the transition may be smoothed across a predefined time signature such as one second or half a second. The smoothed transition may be configured such that the re-scaling of the y-axis according to the recalculated dynamic scaling factor and/or the re-scaling of the graph visual elements according to the recalculated dynamic scaling factor is smoothed such that there are one or more intermediate states between the first rendered state and the second rendered state. In this manner, the graph visual elements effectively grow or shrink gradually in transitioning between the first rendered state and the second rendered state. The graph visual elements are animated such that they transition smoothly between the first rendered state and the second rendered state.

FIG. 6C illustrates several steps further along in the sequence wherein the selected graph visual element has been progressed to May, which is a current month and hence there are no graph visual elements to the right hand side, but since May is the selected graph visual element it is in the centre of the first frame along the x-axis. The y-axis is dynamically re-scaled by rounding up the greatest quantitative value represented by the rendered graph visual elements, in this case May, to the nearest GBP 50, and scaling the axis so that the rounded up Figures fits into the available space in the relevant dimension. It is noted that the scrollable list of the second frame 226 updates as the selected visual graph element 211 changes.

Figure 7A:
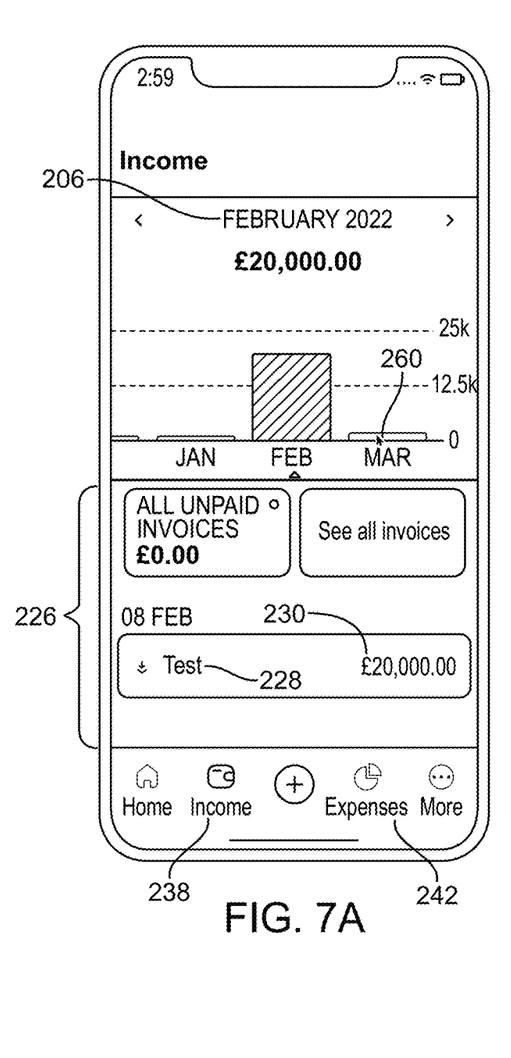
FIGS. 7a to 7c illustrate a sequence of screenshots of the GUI.
Figure 7B:
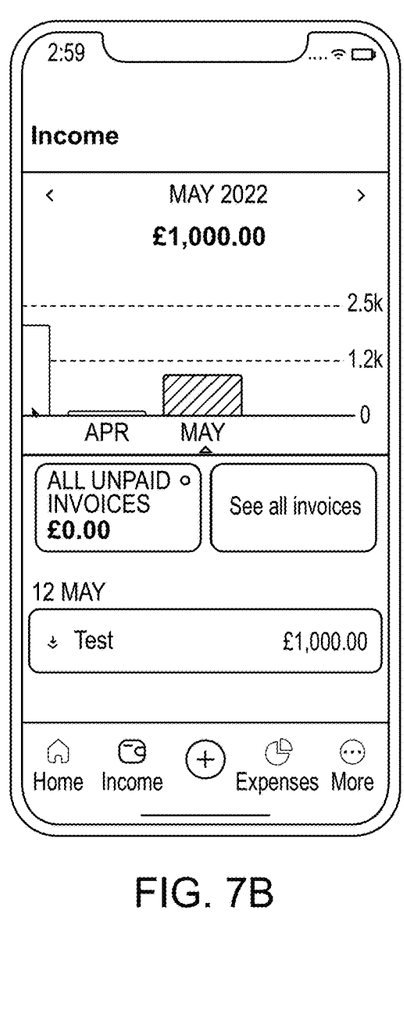
Figure 7C:
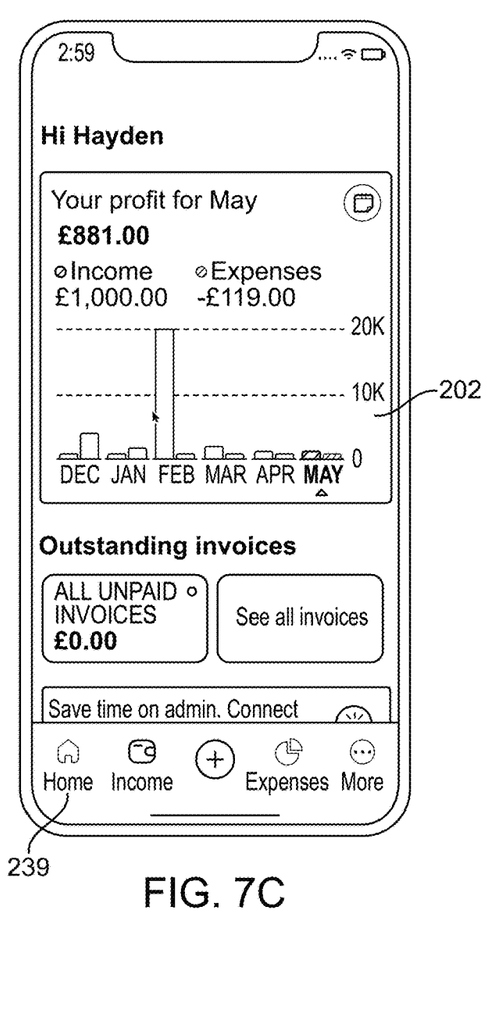

FIGS. 7a to 7c illustrate a sequence of screenshots of a graphical user interface. FIGS. 7a to 7c are a continuation of the sequence illustrated in FIGS. 6a to 6c, the transition from FIG. 6c to FIG. 7a being initiated by a user selection of income button 238. As illustrated in FIG. 7a, the graph visual element for the selected month 211 is represented by a label 206 at the top of the first frame, and indicated by differential shading of the graph visual elements and by a triangular icon underneath the graph visual element. A text representation 208 of the graph data entry of the selected graph visual element 211 is also included at the top of the first frame. The expenses button 242 is de-selected and the income button 238 is selected, and so the time series (i.e., the graph data series) is monthly income. The second frame 226 renders a scrollable list in which individual income transactions are listed by a descriptor 228, for example extracted from bank feed data, and a value 230, for example extracted from bank feed data. The illustrated/rendered graph visual elements are December (at the left hand edge of the first frame), January, February, and March. The greatest quantitative value of the rendered data graph entries is February, and the y-axis scaling is determined by rounding up to the nearest 5 k (strictly) above the greatest quantitative value, and dividing that by the number of available pixels, to arrive at a scale in value/pixel. Lines at fixed value in the y-axis are illustrated at 100% and 50% of the rounded up greatest quantitative value.

A transition to the screenshot of FIG. 7B is initiated by a user interaction with the GUI. In the particular example of FIGS. 7A to 7C, a user controls a cursor 260, for example, by pressing a stylus on a touchscreen display, by pressing a finger on a touchscreen display, or by another input mechanism. The user controls the cursor to scroll the graph in the first dimension (i.e., the x-axis dimension) and a user selection is made such that May becomes the selected month, for example by a cursor press, a double tap, or some other user interaction that the GUI processes as a user selection. Alternatively, the selected month may simply be the month that is located at the central point of the first frame in the first dimension as a consequence of the user initiated scrolling action in the first dimension. The user selection changes the selected graph visual element 211 from February in FIG. 7A to May in FIG. 7B, optionally via one or more intermediate scenarios in which March and/or April are the selected months. The illustrated/rendered graph visual elements are March (at the left hand edge of the first frame), April, and May. The greatest quantitative value of the rendered data graph entries is March, and the y-axis scaling is determined by rounding up to the nearest multiple of 0.5 k above the greatest quantitative value, and dividing that by the number of available pixels, to arrive at a scale in value/pixel. Lines at fixed value in the y-axis are illustrated at 100% and 50% of the rounded up greatest quantitative value. The y-axis is dynamically re-scaled from FIG. 7A to FIG. 7B.

FIG. 7C illustrates the consequence of a user action to select the home icon 239. The first frame illustrates two time series as discussed above in relation to FIGS. 5A and 5B, in this case the income time series and the expenditure time series. Scrolling of the first frame 202 in which the graph is displayed such that the greatest quantitative value represented by a rendered graph visual element change, will cause a dynamic re-scaling of the y-axis.

FIGS. 6A to 6C, and 7A to 7C, illustrate transitions in rendering of the first frame (and second frame) brought about by user scrolling actions. User interactions with the first frame of the GUI may also include zooming interactions in the first dimension. For example, a zooming interaction may be by a two-point pinch gesture (zoom out), or a two-point expand gesture (zoom in) in case of a touchscreen, or via specific GUI buttons for altering zoom. The change in zoom changes granularity of the x-axis. In the example of a time series, the effect is to change the time period represented by each bar in the bar chart. The GUI may be configured with a plurality of available time periods, from a smallest period per bar being a day, to a week, to a month, to a quarter, to a year. Zooming in and out causes the time series to change the time period represented by each bar i.e., to change the granularity in the x-axis. The y-axis is dynamically re-scaled according to the quantitative values of the graph data entries determined according to the new time period per bar.

Embodiments are particularly advantageous when the user device is a mobile device such as a smartphone or a tablet. Embodiments optimise use of limited physical space for illustrating detailed and complex data.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A system implementing a graphical user interface for display on a display screen of a user device, wherein the graphical user interface is configured for display in a window occupying all or a portion of the display screen and comprising:
a first frame occupying a first frame region of the window, wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to a selective zooming and/or scrolling of the first frame region in the first dimension by user interaction with the first frame region,
the graph visual elements each having, in a second dimension, a linear extent or a position determined according to a size of the first frame region in the second dimension, the quantitative value of the respective graph data entry, and a dynamic scaling factor,
wherein, in response to the selective zooming and/or scrolling of the first frame in the first dimension, the graph data entries belonging to the continuous subset of graph data entries represented by the graph visual elements changes, and the dynamic scaling factor changes according to the quantitative values of a changed continuous subset of graph data entries, wherein the first frame transitions from a first rendered state before the selective zooming and/or scrolling of the first frame region in the first dimension by the user interaction with the first frame region, to a second rendered state responding to the selective zooming and/or scrolling of the first frame region in the first dimension by the user interaction with the first frame region, and wherein between the first rendered state and the second rendered state the first frame region is rendered in one or more intermediate rendered states, wherein any graph visual element rendered in both the first rendered state and the second rendered state and resized according to the dynamic scaling factor, is resized in a progressive stepwise manner between subsequent rendered states.

2. The system according to claim 1, wherein the first dimension and second dimension are mutually orthogonal and are parallel to respective edges of the display screen of the user device.

3. The system according to claim 2, wherein the respective edges of the display screen of the user device with which the first dimension and second dimension are parallel is interchangeable according to a rotation of the window in response to physical rotation of the user device.

4. The system according to claim 1, wherein the graphical user interface further comprises a second frame occupying a second frame region of the window, the second frame illustrates, for a selected graph data entry among the sequence of graph data entries, at least a portion of a plurality of entry components of the selected graph data entry, the plurality of entry components being individually labelled quantitative values which are combined to calculate the quantitative value of the selected graph data entry.

5. The system according to claim 4, wherein the selected graph data entry is selected by the user interaction with the first frame region, by a user input located at the graph visual element representing the selected graph data entry.

6. The system according to claim 4, wherein the second frame illustrates a portion of the plurality of entry components of the selected graph data entry as a selectively scrollable list of component visual elements, each component visual element comprising a respective individually labelled quantitative value, wherein, in response to selective zooming and/or scrolling of the second frame in the second dimension, the portion of the plurality of entry components of the selected graph data entry changes.

7. The system according to claim 1, wherein the graphical user interface is a single page application or is a part of a single page application.

8. The system according to claim 1, wherein the sequence of graph data entries are stored on a server and loaded onto the user device by the graphical user interface on demand according to the selective zooming and/or scrolling of the first frame in the first dimension, wherein the graphical user interface is configured, while the graph visual elements representing the continuous subset of graph data among the sequence of graph data entries are illustrated in the first frame, checking whether a predefined number of graph data entries either side of the continuous subset are loaded on the user device, and if they are not loaded on the user device, loading onto the user device any missing graph data entries from among the predefined number of graph data entries either side of the continuous subset.

9. The system according to claim 1, wherein the graphical user interface is part of an online bookkeeping system providing an online bookkeeping service to users, the graphical user interface being accessible to a logged in user.

10. The system according to claim 1, wherein the sequence of graph data entries forms one or more time series so that the defined placement among the sequence of each graph data entry is defined primarily according to a time period represented by the respective graph data entry and secondarily according to the time series to which the graph data entry belongs.

11. The system according to claim 10, wherein the one or more time series comprises two time series, and for each of a continuous series of time periods there is a graph data entry in each of the two time series.

12. The system according to claim 10, wherein a first time series represents income per time period and a second time series represents expenditure per time period, wherein income and expenditure per time period are calculated by obtaining a transaction dataset for a user, financial transactions being represented in the transaction dataset by an entry component having a label, an associated time value, and a quantitative value representing transaction value, each graph data entry being calculated by identifying entry components having an associated time value belonging to the time period, classifying the identified entry components as income or expenditure, and summing the entry components per class to determine the quantitative value of the graph data entry.

13. The system according to claim 1, wherein the selective zooming and/or scrolling of the first frame region in the first dimension by user interaction with the first frame region is a selective zooming in or out in the first dimension, the graphical user interface being configured to respond to the selective zooming in or out in the first dimension by changing granularity of the graph visual elements in the first dimension.

14. The system according to claim 13, wherein the granularity is changed within a series of predefined granularities.

15. The system according to claim 14, wherein the sequence of graph data entries forms one or more time series, and wherein the predefined granularities are time periods represented by each graph visual element, and optionally wherein the series of predefined granularities includes one day per graph visual element, one week per graph visual element, one calendar month per graph visual element, and one quarter-year per graph visual element.

16. The system according to claim 1, wherein the user device is a mobile device, and optionally wherein the mobile device is a smart phone or a tablet and the display screen is a touchscreen.

17. A system comprising a server computing apparatus and a user device, the server computing apparatus comprising memory hardware storing a single page application for serving to the user device, and a network interface for serving the single page application to the user device, the user device comprising a network interface for receiving the single page application from the server computing apparatus, memory hardware for storing the received single page application, processing hardware for executing processing instructions and/or processing logic defined by the stored single page application, and a display screen for displaying a graphical user interface defined by the single page application, wherein the graphical user interface for display on the display screen of the user device, the graphical user interface being configured for display in a window occupying all or a portion of the display screen and comprising:

a first frame occupying a first frame region of the window, wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to a selective zooming and/or scrolling of the first frame region in the first dimension by user interaction with the first frame region, the graph visual elements each having, in a second dimension, a linear extent or a position determined according to a size of the first frame region in the second dimension, the quantitative value of the respective graph data entry, and a dynamic scaling factor, wherein, in response to the selective zooming and/or scrolling of the first frame in the first dimension, the graph data entries belonging to the continuous subset of graph data entries represented by the graph visual elements changes, and the dynamic scaling factor changes according to the quantitative values of a changed continuous subset of graph data entries, wherein the first frame transitions from a first rendered state before the selective zooming and/or scrolling of the first frame region in the first dimension by the user interaction with the first frame region, to a second rendered state responding to the selective zooming and/or scrolling of the first frame region in the first dimension by the user interaction with the first frame region, and wherein between the first rendered state and the second rendered state the first frame region is rendered in one or more intermediate rendered states, wherein any graph visual element rendered in both the first rendered state and the second rendered state and resized according to the dynamic scaling factor, is resized in a progressive stepwise manner between subsequent rendered states.

18. A non-transitory computer-readable medium storing a computer program comprising processing instructions which, when executed by a computing apparatus, cause the computing apparatus to display, on a display screen of the computing apparatus, a graphical user interface, the graphical user interface being configured for display in a window occupying all or a portion of the display screen and comprising:

a first frame occupying a first frame region of the window, wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to a selective zooming and/or scrolling of the first frame region in the first dimension by user interaction with the first frame region, the graph visual elements each having, in a second dimension, a linear extent or a position determined according to a size of the first frame region in the second dimension, the quantitative value of the respective graph data entry, and a dynamic scaling factor, wherein, in response to the selective zooming and/or scrolling of the first frame in the first dimension, the graph data entries belonging to the continuous subset of graph data entries represented by the graph visual elements changes, and the dynamic scaling factor changes according to the quantitative values of a changed continuous subset of graph data entries, wherein the first frame transitions from a first rendered state before the selective zooming and/or scrolling of the first frame region in the first dimension by the user interaction with the first frame region, to a second rendered state responding to the selective zooming and/or scrolling of the first frame region in the first dimension by the user interaction with the first frame region, and wherein between the first rendered state and the second rendered state the first frame region is rendered in one or more intermediate rendered states, wherein any graph visual element rendered in both the first rendered state and the second rendered state and resized according to the dynamic scaling factor, is resized in a progressive stepwise manner between subsequent rendered states.

19. A method comprising:

configuring a graphical user interface for display on a display screen of a user device, wherein the graphical user interface is configured for display in a window occupying all or a portion of the display screen and comprises:

a first frame occupying a first frame region of the window, wherein the first frame illustrates, adjacent to one another in a first dimension, graph visual elements, each graph visual element representing a respective graph data entry from a continuous subset among a sequence of graph data entries, each of the sequence of graph data entries having a defined placement among the sequence and a quantitative value, wherein the continuous subset is determined in response to a selective zooming and/or scrolling of the first frame region in the first dimension by user interaction with the first frame region, the graph visual elements each having, in a second dimension, a linear extent or a position determined according to a size of the first frame region in the second dimension, the quantitative value of the respective graph data entry, and a dynamic scaling factor, wherein, in response to the selective zooming and/or scrolling of the first frame in the first dimension, the graph data entries belonging to the continuous subset of graph data entries represented by the graph visual elements changes, and the dynamic scaling factor changes according to the quantitative values of a changed continuous subset of graph data entries, wherein the first frame transitions from a first rendered state before the selective zooming and/or scrolling of the first frame region in the first dimension by the user interaction with the first frame region, to a second rendered state responding to the selective zooming and/or scrolling of the first frame region in the first dimension by the user interaction with the first frame region, and wherein between the first rendered state and the second rendered state the first frame region is rendered in one or more intermediate rendered states, wherein any graph visual element rendered in both the first rendered state and the second rendered state and resized according to the dynamic scaling factor, is resized in a progressive stepwise manner between subsequent rendered states.

* * * * *